(12) United States Patent
Tao et al.

(10) Patent No.: US 11,558,999 B2
(45) Date of Patent: Jan. 24, 2023

(54) GARDEN TOOL AND CONTROL METHOD THEREOF

(71) Applicant: Globe (Jiangsu) Co., Ltd, Jiangsu (CN)

(72) Inventors: Xing Tao, Jiangsu (CN); Shouchuan Feng, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 231 days.

(21) Appl. No.: 17/095,708

(22) Filed: Nov. 11, 2020

(65) Prior Publication Data

US 2021/0153427 A1    May 27, 2021

(30) Foreign Application Priority Data

Nov. 21, 2019 (CN) .......................... 201911146153.6

(51) Int. Cl.
*A01D 34/82* (2006.01)
*A01D 34/68* (2006.01)

(52) U.S. Cl.
CPC .... *A01D 34/824* (2013.01); *A01D 2034/6843* (2013.01)

(58) Field of Classification Search
CPC ...................... A01D 34/824; A01D 2034/6843
See application file for complete search history.

(56) References Cited

U.S. PATENT DOCUMENTS

| 4,882,897 A | 11/1989 | Oshima et al. |
| 4,930,369 A * | 6/1990 | Barnard ............. A01D 34/6806 56/10.8 |
| 4,991,382 A * | 2/1991 | Scag .................. A01D 34/6806 56/11.4 |
| 5,020,308 A * | 6/1991 | Braun .................. B62D 51/002 56/11.5 |
| 5,138,824 A * | 8/1992 | Oshima .............. A01D 34/6806 56/11.8 |

(Continued)

FOREIGN PATENT DOCUMENTS

| CN | 208143877 U | 11/2018 |
| EP | 0826297 A2 | 3/1998 |

(Continued)

OTHER PUBLICATIONS

Extended European Search Report of counterpart European Patent Application No. 20208786.2 dated Jul. 12, 2021.

*Primary Examiner* — Abigail A Risic (57) ABSTRACT

A hand-push garden tool and a control method thereof. The hand-push garden tool comprises a main body, wheel and a handle assembly. The wheels are mounted on the main body, the handle assembly is mounted on the main body. The handle assembly comprises a handle, a first control rod and a second control rod. The first control rod is mounted on the handle and can rotate relative to the handle, the second control rod is mounted on the handle and can rotate relative to the handle, and the first control rod and the second control rod are coaxially arranged. The first control rod and the second control rod of the hand-push garden tool can coaxially rotate and cannot affect each other, the garden tool is convenient, beautiful and clean and tidy, and design spaces are saved.

7 Claims, 10 Drawing Sheets

(56) References Cited

U.S. PATENT DOCUMENTS

| | | | |
|---|---|---|---|
| 5,155,985 A * | 10/1992 | Oshima | A01D 34/6806 |
| | | | 56/10.8 |
| 5,261,214 A | 11/1993 | Wollersheim | |
| 5,806,374 A * | 9/1998 | Mizutani | A01D 34/6806 |
| | | | 74/483 PB |
| 6,105,348 A | 8/2000 | Turk et al. | |
| 8,660,744 B2 * | 2/2014 | Derby, V | A01D 34/824 |
| | | | 56/10.8 |
| 11,219,161 B2 * | 1/2022 | Zhu | A01D 34/68 |
| 2003/0006073 A1 * | 1/2003 | Iida | A01D 34/6806 |
| | | | 180/383 |
| 2011/0036065 A1 | 2/2011 | Wong et al. | |
| 2013/0046448 A1 * | 2/2013 | Fan | A01D 34/68 |
| | | | 56/10.8 |
| 2018/0116119 A1 * | 5/2018 | Wu | F16H 59/041 |

FOREIGN PATENT DOCUMENTS

| | | | |
|---|---|---|---|
| EP | 2875709 A1 | 5/2015 | |
| EP | 3210452 A1 | 8/2017 | |

* cited by examiner

GARDEN TOOL AND CONTROL METHOD THEREOF

CROSS-REFERENCE TO RELATED INVENTIONS

This invention is a US invention which claims the priority of CN invention Serial No. 201911146153.6, filed on Nov. 21, 2019, the disclosures of which are hereby incorporated by reference in their entirety.

TECHNICAL FIELD

The invention relates to a garden tool and a control method thereof.

BACKGROUND ART

Lawn mowers are generally provided with a self-propelled function. Therefore, a control rod of a self-propelled motor and a control rod of a mowing motor are provided on a handle of the lawn mower. The two control rods are generally arranged on both sides of the handle. However, due to structural interference, the two control rods cannot be coaxial, which makes the distance between one control rod and the handle is inconsistent with the distance between the other control rod and the handle, resulting in the poor operating experience.

It is necessary to provide a garden tool to solve the above problems.

SUMMARY OF INVENTION

The object of the present invention is to provide a garden tool, which is convenient to operate.

To achieve the above object, the present invention provides a garden tool, which includes a main body, a wheel installed on the main body, and a handle assembly installed on the main body. The handle assembly includes a handle, a first control rod installed on the handle that is rotatable with respect to the handle and a second control rod that is installed on the handle and is rotatable with respect to the handle. The first control rod and the second control rod are arranged coaxially.

As a further improvement of the present invention, the handle includes a first arm portion inclining upward and extending backward, and a second arm portion parallel to and spaced from the first arm portion and a connecting portion connecting the first arm portion and the second arm portion, the connecting portion is substantially parallel to the horizontal plane, and the first control rod and the second control rod are separately disposed on the upper and lower sides of the connecting portion.

As a further improvement of the present invention, the handle assembly further comprises a first control box mounted on the first arm portion and a second control box mounted on the second arm portion, the first control box is provided with a first switch, and when the first control rod is pulled, the first switch can be triggered, the second control box is provided with a second switch, and when the second control rod is pulled, the second switch can be triggered.

As a further improvement of the present invention, the first control box is provided with a first protruding portion, and a first cam that is installed on the first protruding portion and can trigger the first switch, the first control rod is coaxially connected with the first cam, and when the first control rod is rotated, the first cam can be driven to trigger the first switch.

As a further improvement of the present invention, the second control box is provided with a second protruding portion coaxially arranged with the first protruding portion, and a second cam that is mounted on the second protruding portion can trigger the second switch, the second control rod is coaxially connected with the second cam, and when the second control rod is rotated, the second cam can be driven to trigger the second switch.

As a further improvement of the present invention, the first control rod and the second control rod are alternately installed on the handle.

As a further improvement of the present invention, the handle assembly further comprises a first elastic piece that can drive the first control rod to reset and a second elastic piece that can drive the second control rod to reset, the first elastic piece is located between the first control rod and the first control box, and the second elastic piece is located between the second control rod and the second control box.

An object of the present invention is to provide a control method of a hand-push garden tool to control the start and stop of the hand-push garden tool.

To achieve the above object, the present invention provides a control method for a hand-push garden tool. The hand-push garden tool includes a main body, a switch, and a handle assembly mounted on the main body. The handle assembly includes a handle, a first control rod that is rotatable relative to the handle and a second control rod that is coaxially disposed with the first control rod. The control method of the hand-push garden tool includes:

press the switch to turn on the hand-push garden tool;
pull the first control rod to rotate it from a first initial position to a first set position;
press the switch again, a first work assembly controlled by the first control rod starts to work;
release the first control rod, the first control rod returns to the first initial position, and the first work assembly controlled by the first control rod stops working.

As a further improvement of the present invention, the control method further comprises:

press the switch to turn on the hand-push garden tool;
pull the second control rod to rotate it from the second initial position to the second set position, and a second work assembly controlled by the second control rod starts to work;
release the second control rod, the second control rod returns to the second initial position, and the second work assembly controlled by the second control rod stops working.

As a further improvement of the present invention, the rotation angle of the first control rod rotated from the first initial position to the first set position is smaller than that of the second control rod rotated from the second initial positions to the second set position.

The beneficial effect of the present invention is that the first control rod of the hand-push garden tool and the second control rod of the hand-push garden tool are coaxially, which is not only convenient to operate, beautiful, tidy, but also coordinated on both sides, which can save design space and make the user experience better.

DESCRIPTION OF EMBODIMENT

In order to make the objectives, technical solutions, and advantages of the present invention clearer, the following describes the present invention in detail with reference to the accompanying drawings and specific embodiment.

Figure 1:
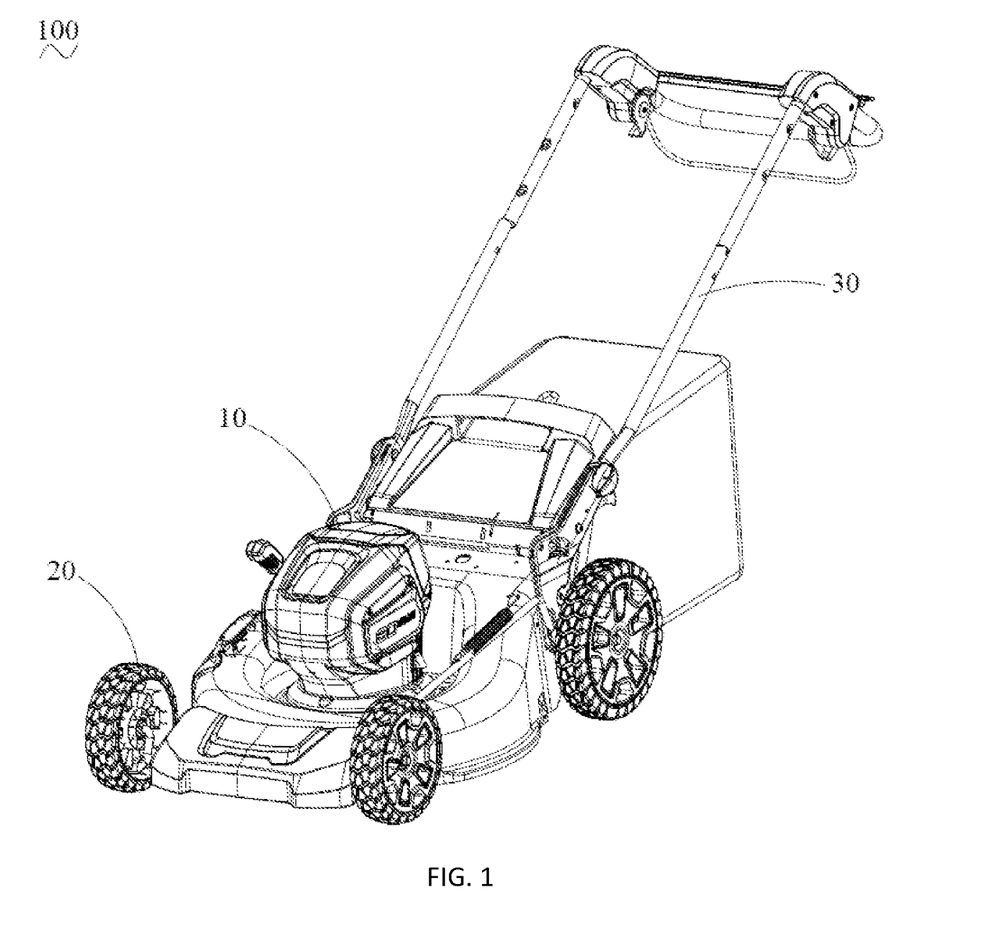
FIG. 1 is a perspective view of the garden tool according to the present invention.

As shown in FIG. 1, the present invention discloses a garden tool 100 which can be a lawn mower, a snowplow or the like. In order to clarify the technical solution of the present invention, a lawn mower is taken as an example for detailed description below.

The lawn mower 100 includes a main body 10, a wheel 20 mounted on the main body 10, at least one self-propelled motor (not shown) connected to the wheel 20, and a handle assembly 30 mounted on the main body 10. The self-propelled motor is used to drive the wheel 20.

A main blade motor, a functional assembly, a power source, and a control board for controlling the functional assembly and the self-propelled motor are installed in the main body 10. The functional assembly is used to assist in implementing related functions, such as mowing, snowing. In this embodiment, the power source is a battery pack that is used to provide power to the lawn mower 100. Of course, the power source may also be an external power source, it is not limited herein. The control board is used to control the main blade motor and the self-propelled motor. Because the main blade motor, functional assembly, power source and control board can be designed with reference to existing solutions, they will not be described here.

Figure 2:
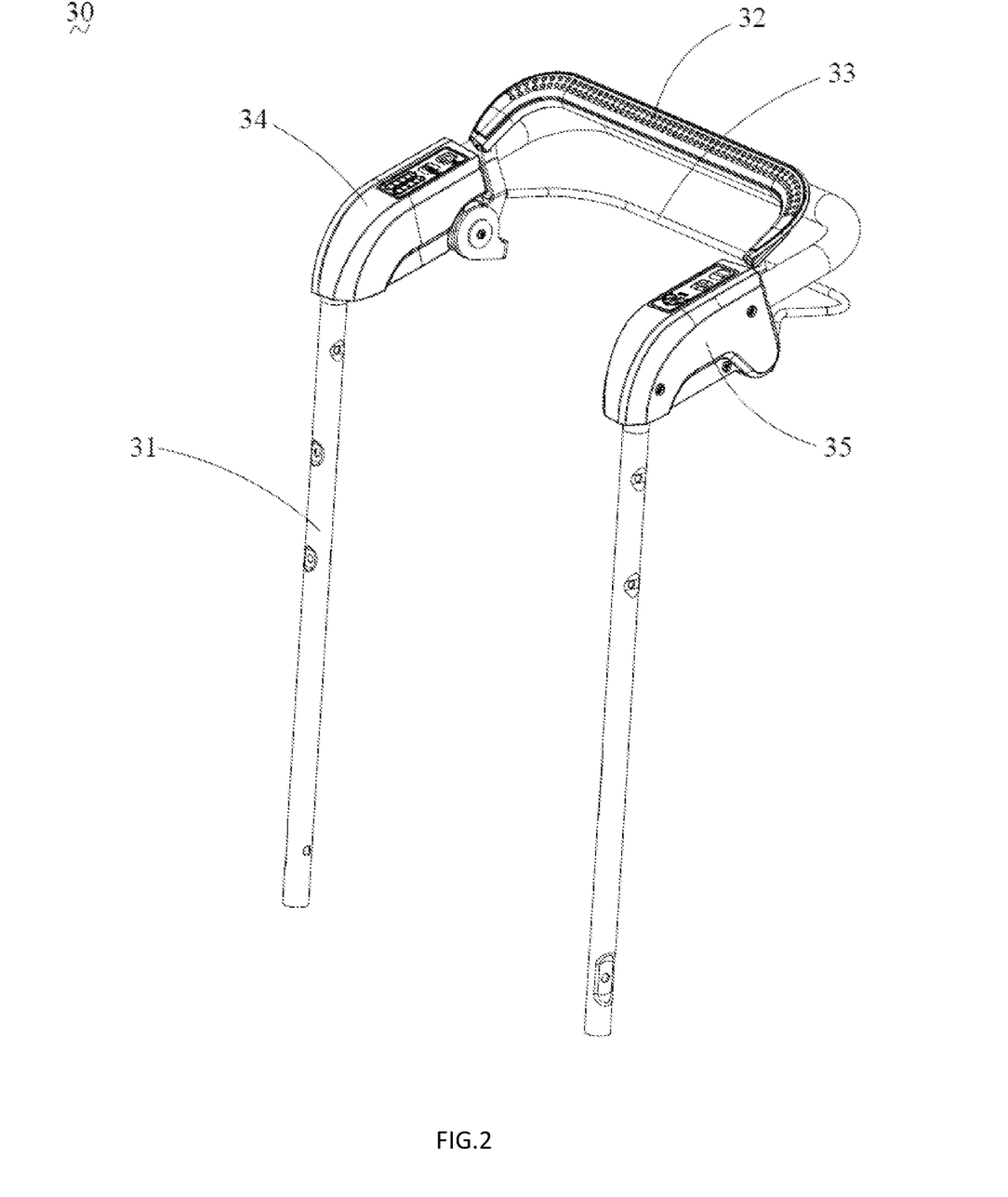
FIG. 2 is a perspective view of the handle assembly in FIG. 1.
Figure 3:
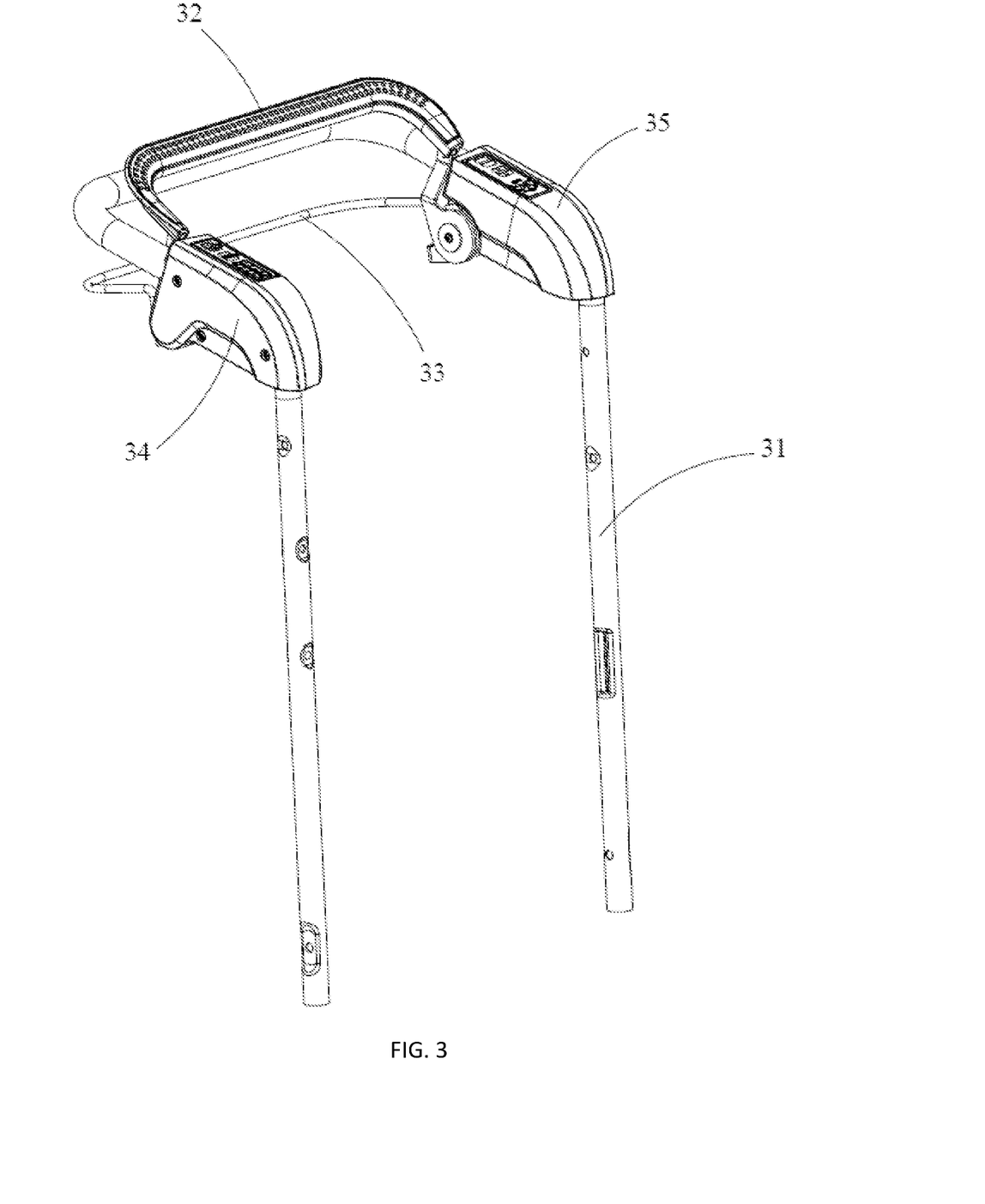
FIG. 3 is another perspective view of the handle assembly shown in FIG. 2.

As shown in FIG. 2 and FIG. 3, the handle assembly 30 includes a handle 31, a first control rod 32 which is mounted on the handle 31 and can be rotated relative to the handle 31, and a second control rod 33 which is mounted on the handle 31 and can be rotated relative to the handle 31. The first control rod 32 and the second control rod 33 are arranged coaxially, that is, the first control rod 32 and the second control rod 33 can rotate along the same axis. The handle assembly 30 further includes a control box. In this embodiment, the control box includes a first control box 34 and a second control box 35 which is provided separately from the first control box 34.

Figure 4:
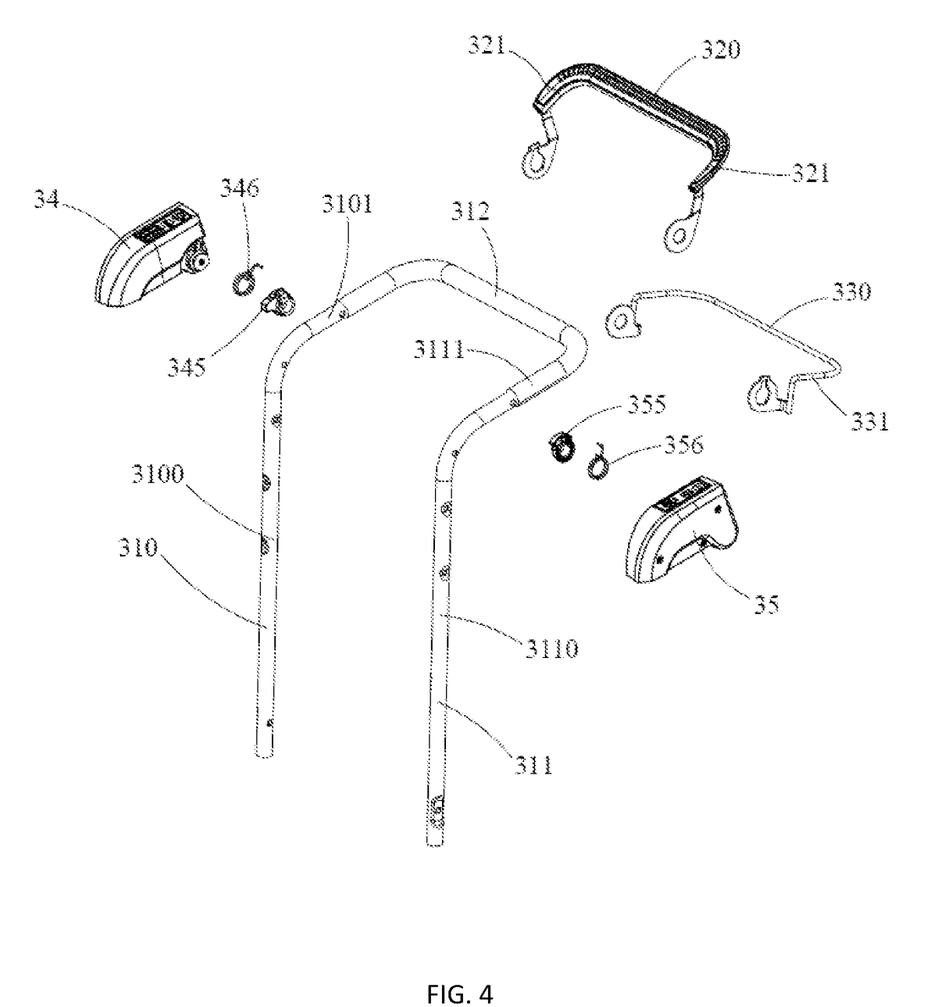
FIG. 4 is an exploded view of the handle assembly shown in FIG. 2.
Figure 5:
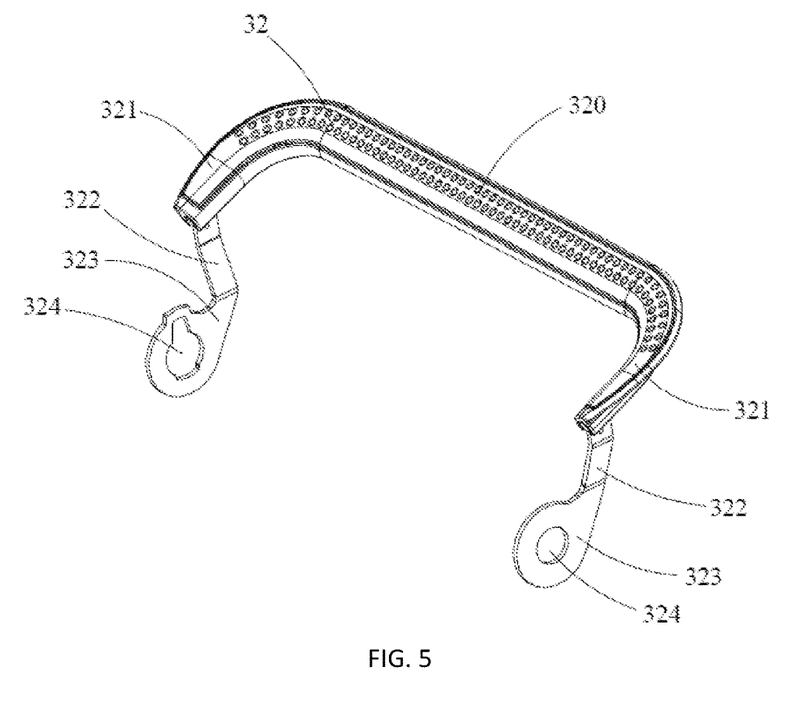
FIG. 5 is a perspective view of the first control rod in FIG. 4.
Figure 6:
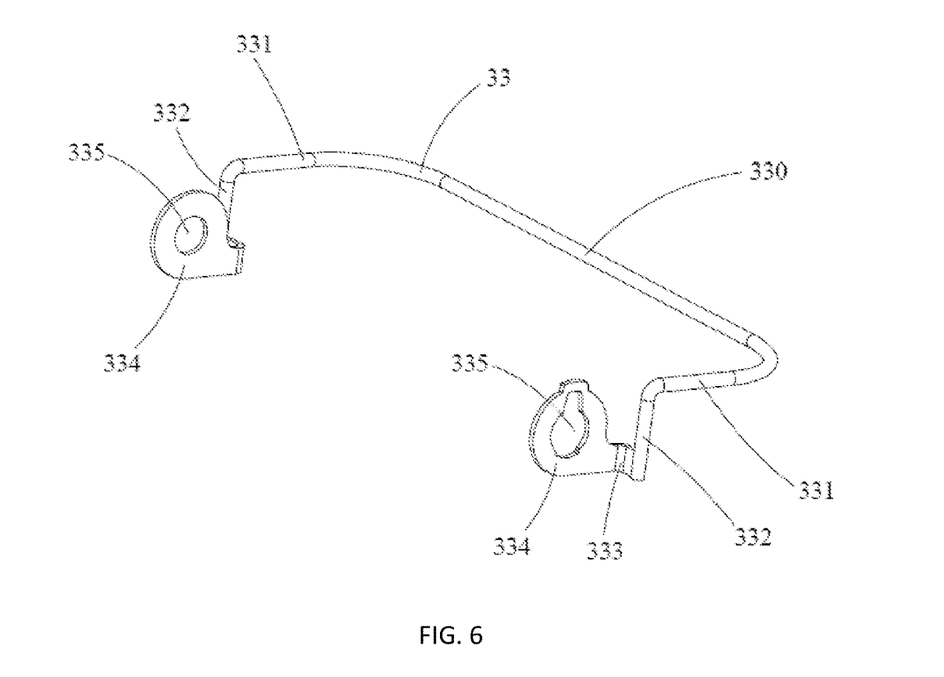
FIG. 6 is a perspective view of a second control rod in FIG. 4.
Figure 7:
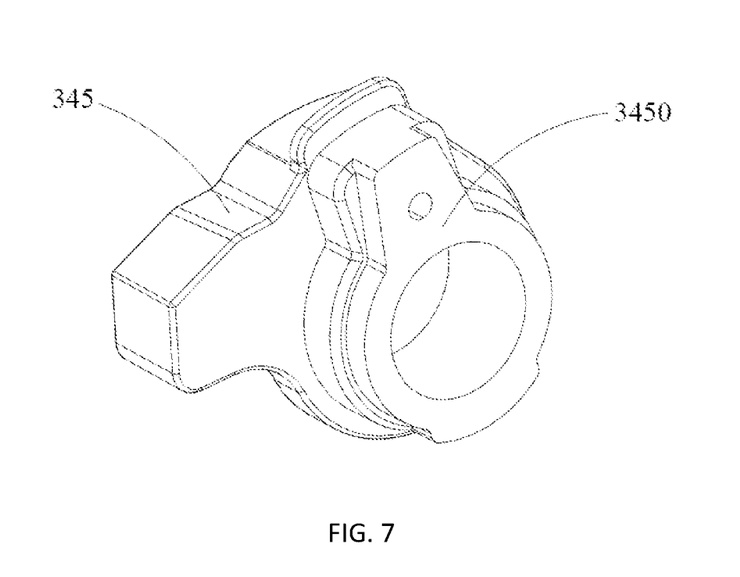
FIG. 7 is a perspective view of a first cam in FIG. 4.
Figure 8:
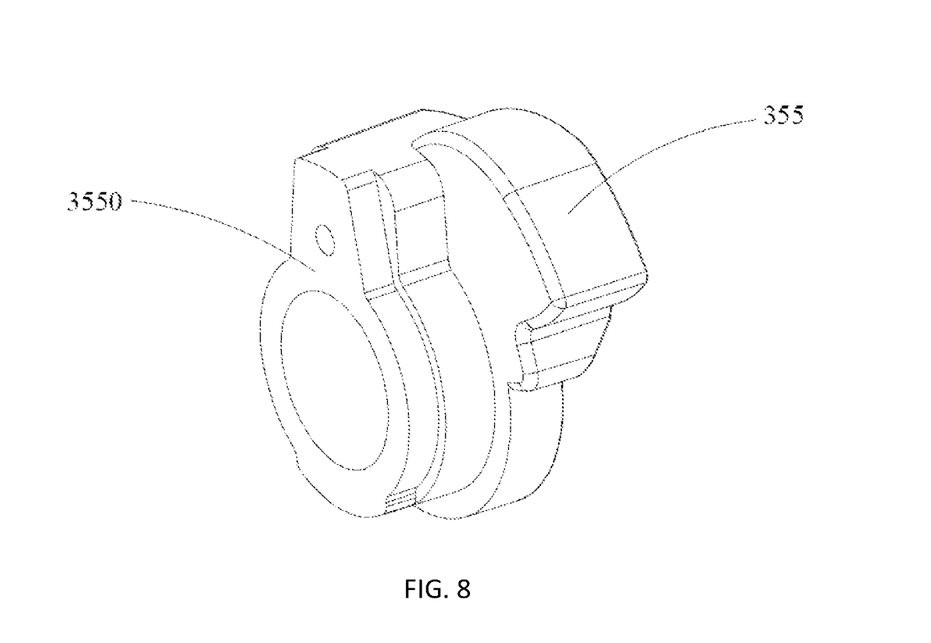
FIG. 8 is a perspective view of a second cam in FIG. 4.

As shown in FIG. 4 to FIG. 6, the handle 31 includes a first arm portion 310 inclined upward and extending backward, a second arm portion 311 disposed parallel to the first arm portion 310, and a connecting portion 312 connecting the first arm portion 310 and the second arm portion 311, the handle 31 is substantially U-shaped. Of course, the handle 31 may also have other suitable structures, which are not limited herein. In this embodiment, the first arm portion 310 includes a first vertical portion 3100 extending mainly upward, and a first horizontal portion 3101 extending mainly rearward from the top end of the first vertical portion 3100. The second arm portion 311 includes a second vertical portion 3110 extending mainly upward and parallel to the first vertical portion 3100, and a second horizontal portion 311 extending substantially rearward from the top end of the second vertical portion 3110 and parallel to the first horizontal portion 3101. The connecting portion 312 connects the first horizontal portion 3101 and the second horizontal portion 3111 to form a hand-push portion for the user to push the lawn mower 100. The connecting portion 312 is substantially parallel to the horizontal plane.

The first control rod 32 includes an elongated first control portion 320 disposed horizontally, first control arms 321 extending forward from two opposite ends of the first control portion 320, first deflecting portions 322 respectively extending downward and deflecting toward each other from the end of the corresponding first control arms 321, and first rotating portions 323 extending downward from the ends of the corresponding first deflecting portions 322. The size of each first rotating portion 323 is larger than the size of the corresponding first deflecting portion 322. Each first rotating portion 323 is provided with a first through hole 324. One of the first through holes 324 is circular, and the other of the first through holes 324 is convex.

The second control rod 33 includes an elongated second control portion 330 disposed horizontally, horizontal second control arms 331 extending forward from two opposite ends of the second control portion 330, second vertical control arms 332 extending downward from the end of the corresponding horizontal second control arms 331, second deflecting portions 333 that deflects from the end of the corresponding second vertical control arms 332 in a direction approaching each other, and second rotation portions 334 extending forward from the end of the corresponding second deflecting portions 333. The size of each second rotating portions 334 is larger than the size of the corresponding second deflecting portion 333. Each of the second rotating portions 334 is provided with a second through hole 335. One of the second through holes 335 is circular, and the other of the second through holes 335 is convex.

In the vertical direction, the first control portion 320 of the first control rod 32 is located on the upper side of the connecting portion 312, and the second control portion 330 of the second control rod 33 is located below the connecting portion 312. Of course, the first control portion 320 may also be disposed on the lower side of the connecting portion 312, and the second control portion 330 is disposed on the upper side of the connecting portion 312. That is, the first control rod 32 and the second control rod 33 are respectively disposed on the upper and lower sides of the connecting portion 312.

Figure 13:
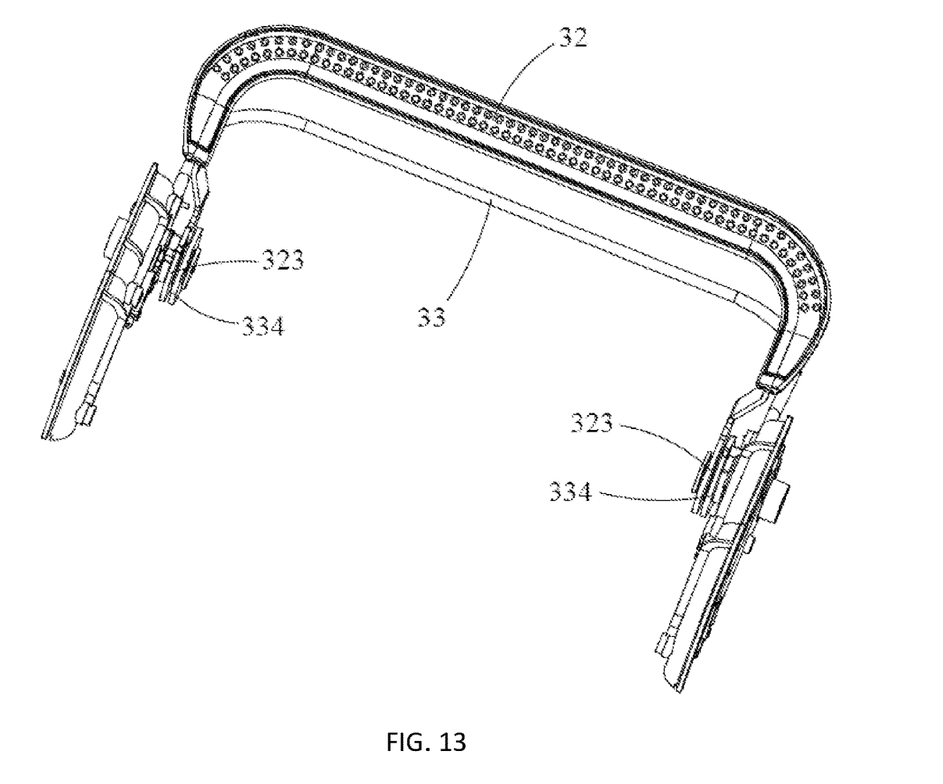
FIG. 13 is a perspective view showing the cooperation of the first control rod and the second control rod after removing partial structures of the handle assembly.
Figure 14:
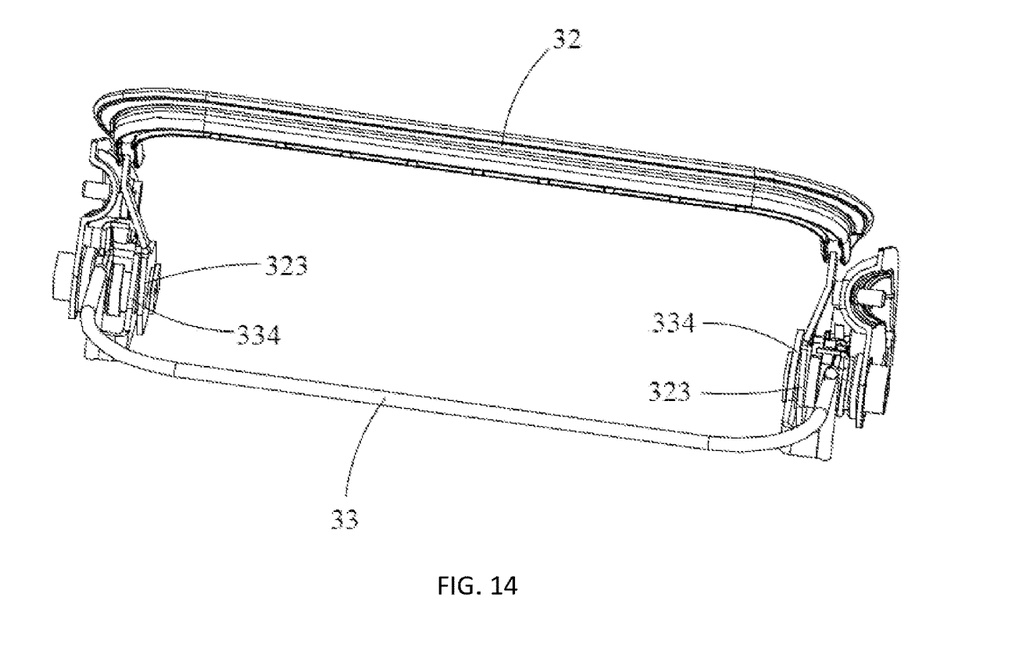
FIG. 14 is another perspective view of FIG. 13.
Figure 15:
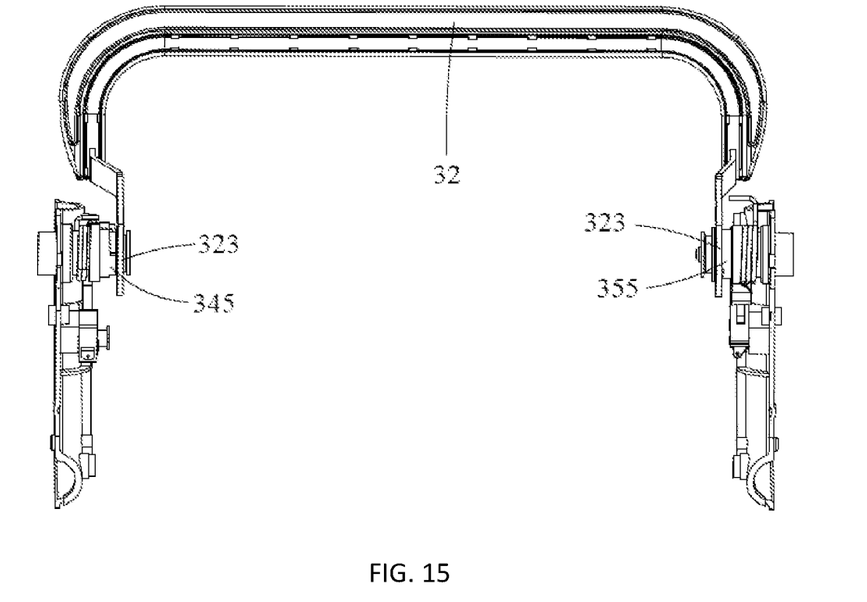
FIG. 15 is a perspective view with the second control rod in FIG. 13 removed.
Figure 16:
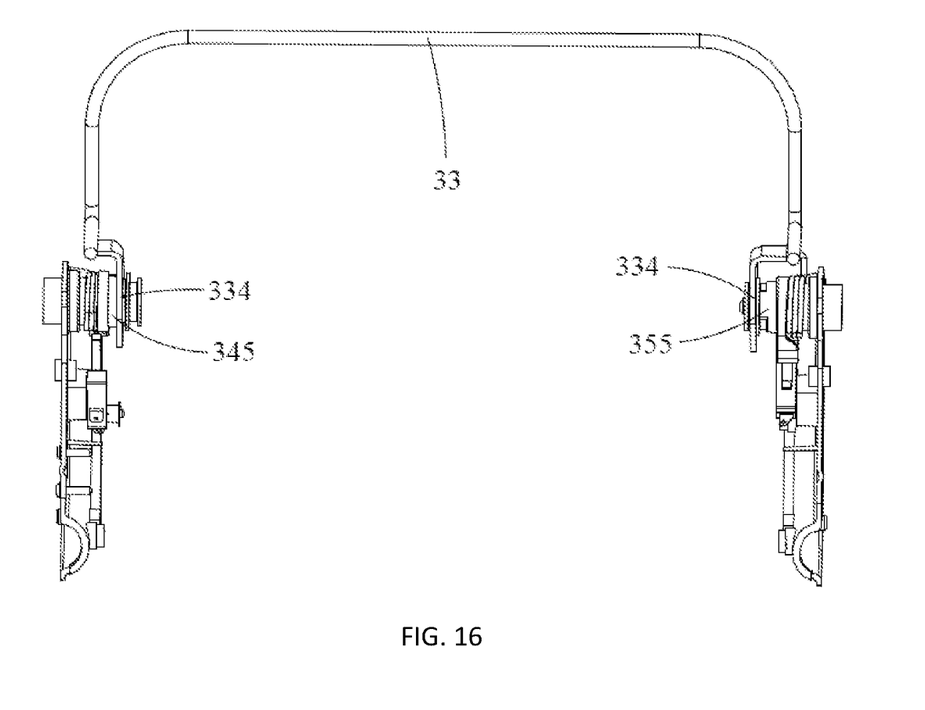
FIG. 16 is a perspective view with the first control rod in FIG. 13 removed.

As shown in FIG. 2 to FIG. 10 in combination with FIG. 13 to FIG. 15, the first control box 34 is mounted on the first horizontal portion 3101 of the first arm portion 310 of the handle 31 near the first vertical portion 3100. Of course, the first control box 34 can also be mounted at a suitable position of the handle 31 or other structures that is convenient for users to operate, which is not limited here. The first control box 34 includes a first left case 340, a first right case 341 that cooperates with the first left case 340, a first intermediate case 342 that is sandwiched between the first left case 340 and the first right case 341, a first display panel 343 on the first left case 340, a first switch 344 installed on the first intermediate case 342 for controlling the main blade motor, a first cam 345 that activates or deactivates the first switch 344, and a first elastic piece 346 that can drive the first cam 345 to reset. The first elastic piece 346 is disposed at the connecting portion between the first control rod 32 and the first control box 34.

Figure 9:
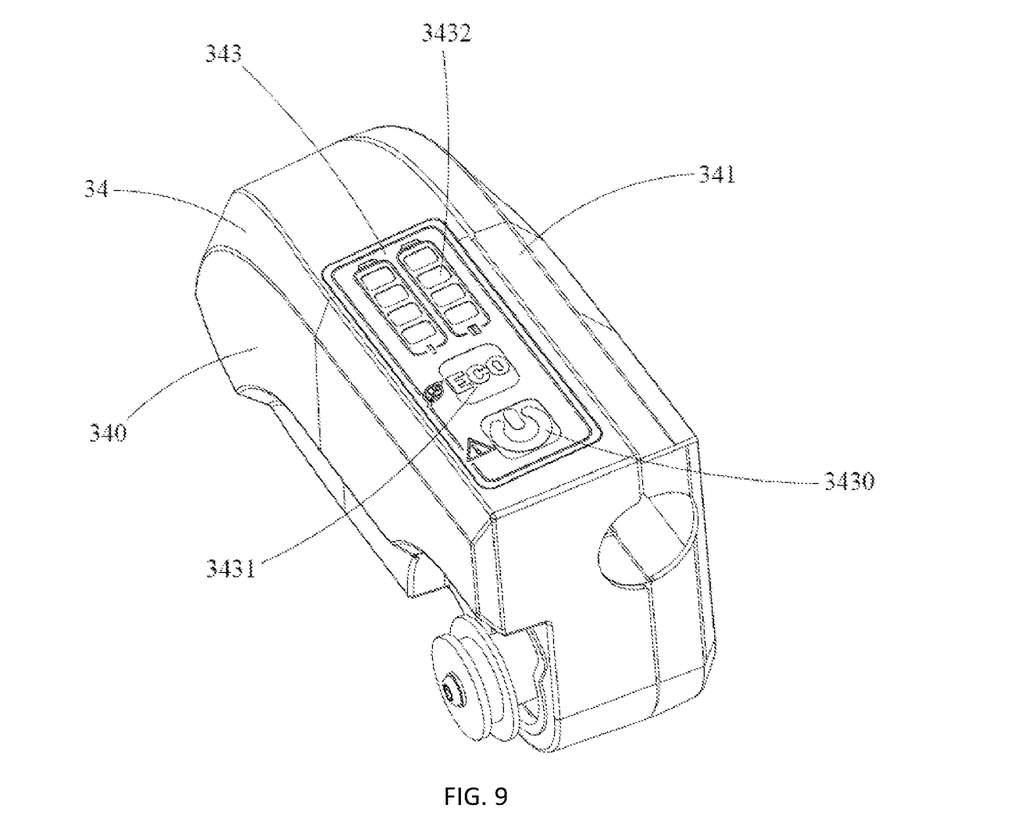
FIG. 9 is a perspective view of the first control box in FIG. 4.
Figure 10:
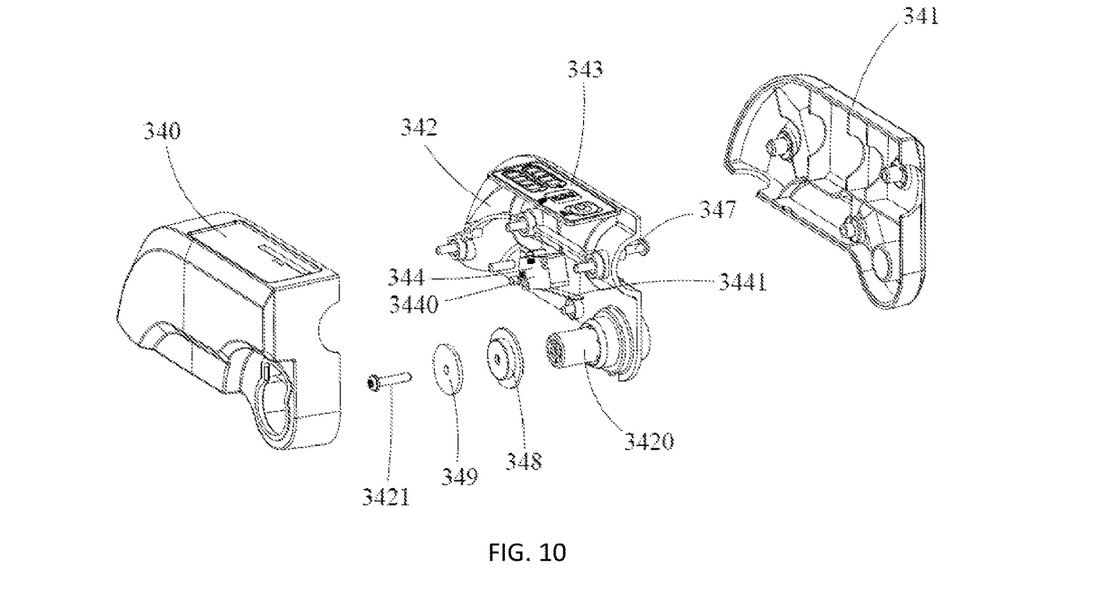
FIG. 10 is an exploded view of the first control box shown in FIG. 9.

The first left case 340 and the first right case 341 are fixed together by bolts 347, and the first intermediate case 342 is clamped by the first left case 340 and the first right case 341 and locked by the bolts 347, so the first left case 340 and the first right case 341 are fixed together. Of course, the first control box 34 can also be designed with other numbers of cases and mating structures according to specific needs, and the first display panel 343 can also be exposed on other positions suitable for user to observe and operate as needed, which is not limited here.

In this embodiment, the first intermediate case 342 includes a first protruding portion 3420 extending beyond the first left case 340 to form a first rotating shaft. The first switch 344 includes a first switch body 3440 and a first elastic piece 3441 extending from the first switch body 3440 to the first cam 345. The first switch 344 is a micro switch, and may also be another suitable switch, which is not limited herein. The first cam 345 is sleeved on the first protruding portion 3420 (i.e., the first rotating shaft) and is rotatable relative to the first protruding portion 3420, so that the first cam 345 and the first control rod 32 are coaxially connected. The first cam 345 includes a convex first mating portion 3450, and the convex first through hole 324 of the first control rod 32 cooperates with the first mating portion 3450, thereby the first cam 345 can be driven to rotate when the first control rod 32 is rotated, and then the first cam 345 touches the first elastic piece 3441 to trigger the first switch 344. Of course, the first control rod 32 can also be driven by other suitable structures cooperates with the first cam 345.

The first control box 34 further includes a first sleeve 348 sleeved on the first protruding portion 3420 and located outside the first cam 345, a first blocking piece 349 sleeved on the first protruding portion 3420 and located outside the first sleeve 348, and a first holding member 3421 fixed on the first protruding portion 3420 to fix the first blocking piece 349 and the first sleeve 348 to the first protruding portion 3420. The circular second through hole 335 of the second control rod 33 is sleeved on the first sleeve 348 and is rotatable relative to the first sleeve 348. It can be known from the above description that the connection position between the second control rod 33 and the first control box 34 offsets more inward than the connection position between the first control rod 32 and the first control box 34 toward the inside of the handle 31.

The first display panel 343 of the first control box 34 is provided with a power-on switch 3430, an energy-saving switch 3431 (ECO, Economic model), and a power display device 3432 for displaying power. The power display device 3432 allows a user to observe the use of power. The power-on switch 3430 and the energy-saving switch 3431 can transmit signals to the control board.

As shown in FIG. 2 to FIG. 8, FIG. 11 to FIG. 14 and FIG. 16, the second control box 35 is mounted on the second horizontal portion 3111 of the second arm portion 311 of the handle 31 near the second vertical portion 3110. Of course, the second control box 35 may also be installed at the handle 31 or other suitable position convenient for users to operate, which is not limited herein. The second control box 35 includes a second left case 350, a second right case 351 that cooperates with the second left case 350, a second intermediate case 352 that is sandwiched between the second left case 350 and the second right case 351, a second display panel 353 exposed to the second right case 351, a second switch 354 installed on the second intermediate case 352 to control the self-propelled motor, a second cam 355 that turns on or turns off the second switch 354 and a second elastic piece 356 that can drive the second cam 355 to reset. The second elastic piece 356 is disposed at a connection position between the second control rod 33 and the second control box 35.

Figure 11:
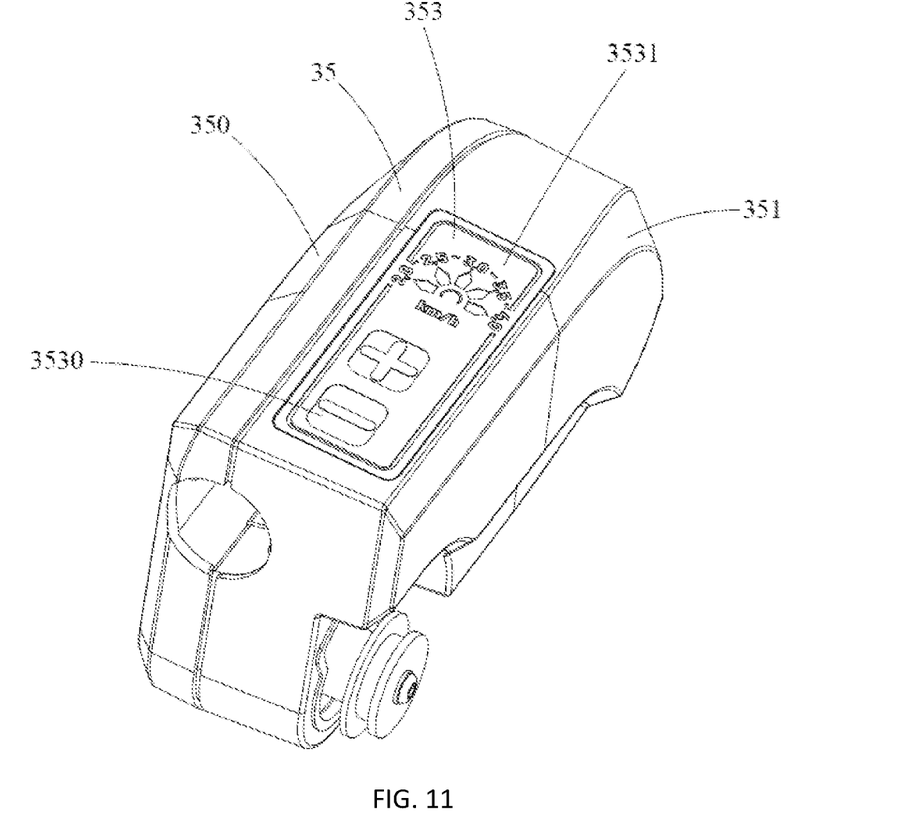
FIG. 11 is a perspective view of a second control box in FIG. 4.
Figure 12:
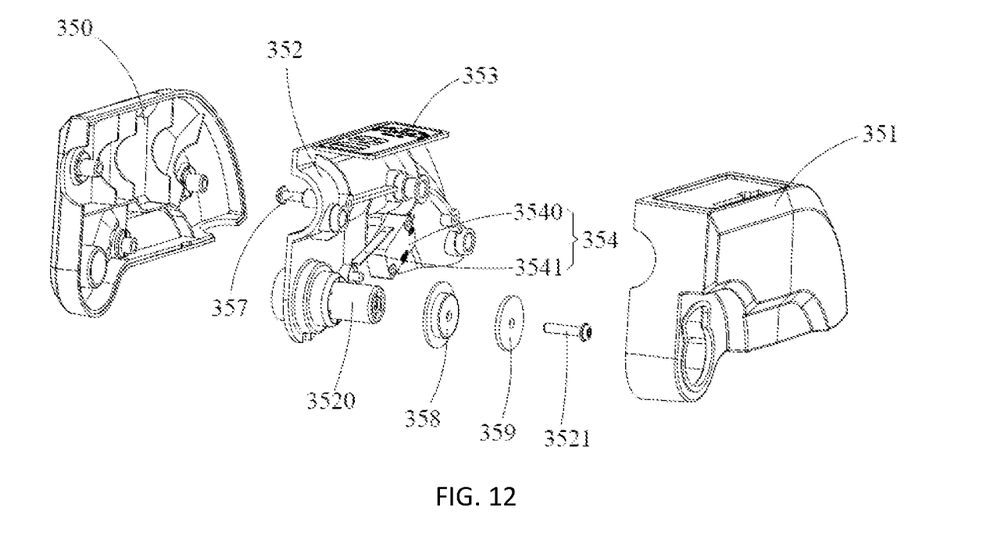
FIG. 12 is an exploded view of the second control box shown in FIG. 11.

The second left case 350 and the second right case 351 are fixed together by bolts 357, and the second intermediate case 352 is clamped by the second left case 350 and the second right case 351 and they are fixed together by bolt 357. Of course, the second control box 35 can also be designed with other number of cases and mating structures according to specific needs, and the second display panel 353 can also be exposed to other positions suitable for user's observation and operation as needed, which is not limited herein.

In this embodiment, the second intermediate case 352 includes a second protruding portion 3520 extending beyond the second right case 351 to form a second rotating shaft. The second protruding portion 3520 and the first protruding portion 3420 are disposed coaxially. The second switch 354 includes a second switch body 3540 and a second elastic piece 3541 extending from the second switch body 3540 to the second cam 355. The second switch 354 is a micro switch, and may also be another suitable switch, which is not limited herein. The second cam 355 is sleeved on the second protruding portion 3520 (i.e., the second rotating shaft) and is rotatable relative to the second protruding portion 3520, so that the second cam 355 and the second control rod 33 are coaxially connected. The second cam 355 includes a convex second mating portion 3550, and the convex second through hole 335 of the second control rod 33 is engaged with the second mating portion 3550. The second cam 355 can be driven to rotate to when the second control rod 33 is rotated, and then the second cam 355 touches the second elastic piece 3541 to trigger the second switch 354. Of course, the second control rod 33 can also cooperate with the second cam 355 via other suitable structures.

The second control box 35 further includes a second sleeve 358 sleeved on the second protruding portion 3520 and located outside the second cam 355, a second blocking piece 359 sleeved on the second protruding portion 3520 and located outside the second sleeve 358, and a second holding member 3521 fixed on the second protruding portion 3520 to fix the second blocking piece 359 and the second sleeve 358 to the second protruding portion 3520. The circular first through hole 324 of the first control rod 32 is sleeved on the second sleeve 358 and is rotatable relative to the second sleeve 358. It can be known from the above description that the connection position between the first control rod 32 and the second control box 35 offsets more inward than the connection position between the second control rod 33 and the second control box 35 toward the inside of the handle 31.

The second display panel 353 of the second control box 35 is provided with a self-propelled speed adjustment switch 3530 and a self-propelled speed display device 3531. The self-propelled speed adjustment switch 3530 transmits a signal to the control board, and the self-propelled speed display device 3531 displays the speed.

The first elastic piece 346 is used to drive the first control rod 32 to reset when the external force disappears, and the second elastic piece 356 is used to drive the second control rod 33 to reset when the external force disappears. In this embodiment, the first elastic piece 346 and the second elastic piece 356 are both torsion springs. Of course, the first elastic piece 346 and the second elastic piece 356 may also be other suitable elastic pieces, which is not limited herein.

The operation control method of the lawn mower 100 will be described in detail below.

The starting method of the main blade motor is described below. First, press the power-on switch 3430 on the first display panel 343 to power on the lawn mower 100. Then, press the first control portion 320 of the first control rod 32 so that the first control rod 32 moves to drive the first cam 345 to rotate clockwise, and the first cam 345 gradually presses the first elastic piece 3441 of the first switch 344 and the first elastic piece 346 is compressed. When the first control rod 32 rotates by a first predetermined angle and is pressed from a first initial position to a first set position, the first switch 344 is triggered. And at this time, the main blade motor is started to drive the mowing blade to start. In this embodiment, the first predetermined angle is 15°.

The first control portion 320 of the first control rod 32 is released. At this time, the first control rod 32 is automatically rotated to the first initial position by the restoring force of the first elastic piece 346, and the first switch 344 is powered off. The circuit of the main blade motor is cut off. At this time, a first work assembly controlled by the first control rod 32 stops working, and the mowing blade stops. In one embodiment, the first work assembly is used for cutting grass.

The operation method of starting self-propelled is described below.

First, press the power-on switch 3430 on the first display panel 343 to power on the lawn mower 100. Then, pull the second control portion 330 of the second control rod 33, so that the second control rod 33 drives the second cam 355 to rotate clockwise. And the second cam 355 gradually presses the second elastic piece 3541 of the second switch 354 to be compressed. When the second control rod 33 rotates by a second predetermined angle and is pressed from the second initial position to the second set position, the second switch 354 is triggered. And the self-propelled motor drives the wheel 20 to travel at this time. In this embodiment, the second predetermined angle is 20°, which is bigger than the first predetermined angle (15°). In other words, the rotation angle when the first control portion 320 rotates from the first initial position to the first set position is smaller than the rotation angle when the second control portion 330 rotates from the second initial position to the second set position.

By pressing the self-propelled speed adjustment switch 3530 on the second display panel 353, the traveling speed of the wheel 20 can be adjusted. When the second control portion 330 is released, the second control rod 33 is automatically rotated to the second initial position by the restoring force of the second elastic piece 356, the second switch 354 is powered off, and the circuit of the self-propelled motor is cut off. At this time, the second work assembly controlled by the second control rod 33 stops working, and the self-propelled motor stops. In one embodiment, the second work assembly is used for driving wheel.

The operation logic of the lawn mower 100 is described below.

Press the power-on switch 3430 on the first display panel 343. At this time, the first control rod 32 and the second control rod 33 are not pulled down, and the indicator lights of the power display device 3432 and the self-propelled speed display device 3531 are respectively on for 5 seconds. And then the self-propelled speed display device 3531 displays the status when the power was last turned off by default, and the power display device 3432 displays the current power. If the power-on switch 3430 is pressed again, the power will be turned off immediately. If there is no action, the power will be automatically turned off after 15 seconds, and the real status will be displayed between 5 seconds and 15 seconds.

After pressing the power-on switch 3430 on the first display panel 343, if one of the first control rod 32 and the second control rod 33 is pulled down, the alarm exclamation light is on to prompt to put down the first control rod 32 or second control rod 33 that is pulled down. After the first control rod 32 or the second control rod 33 that is pulled down is reset, the alarm exclamation light goes out and returns to the normal operation state.

The starting logic of the main blade motor is described below. Press the power-on switch 3430 on the first display panel 343 and pull down the first rod 32 within 15 seconds. Then, if the power-on switch 3430 is pressed again within 3 seconds, the main blade motor runs. After 3 seconds, press the power-on switch 3430 again, at this time the whole machine is powered off.

The shutdown logic of the main blade motor is described below. Release the first control rod 32, and the main blade motor stops. During the operation of the main blade motor, if the power-on switch 3430 is pressed again, it has no effect. After shutdown, the power-on state can be maintained for 10 seconds.

The Eco (energy-saving mode) logic of the main blade motor is described below. The default mode is automatic when power is turned on. Press the energy-saving switch 3431 to switch to the Eco-mode (energy-saving mode). At this time, the Eco-mode indicator is on. Press the energy-saving switch 3431 again to turn down the Eco-mode, and the Eco mode indicator is off.

The self-propelled logic of the self-propelled motor is described below. Press the power-on switch 3430, the self-propelled indicator is on in 5 seconds, and the current speed is the speed at the last shutdown at defaulted after 5 seconds. The self-propelled speed can be set arbitrarily within 10 seconds. If the second control rod 33 is pulled down within 10 seconds, the self-propelled motor runs. If there is no action within 10 seconds, the whole machine is powered off.

The self-propelled speed adjustment switch 3530 can set the self-propelled speed to: 2 km/h, 2.5 km/h, 3 km/h, 3.5 km/h or 4 km/h.

In the present invention, two battery packs are provided with two and they are arranged on the left and right of the main body 10. When the lawn mower 100 is started, the battery pack located on the left is discharged first from the operator's sight. At this time, the power indicator corresponding to the left battery pack lights up. When the left battery pack is exhausted, the battery pack on the right side starts to discharge, and the power indicator corresponding to the right battery pack lights up. In other words, from the perspective of the operator, the order of discharge of the two battery packs and the order of lighting of the corresponding power indicators are defaulted to "left first then right".

The indicator includes 8 green power indicator lights, Eco mode indicator lights that are green, alarm exclamation light that is red, and 5 self-propelled indicators which includes green light indicating 1st gear, 2nd gear and 3rd gear and yellow light indicating 4th gear and 5th gear.

In summary, the lawn mower 100 of the present invention sets the first control rod 32 and the second control rod 33 coaxially, which is not only convenient, beautiful and tidy, but also symmetrical, which can save design space and make the user experience good.

The above embodiment is only used to illustrate the technical solution of the present invention and is not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A hand-push garden tool, which includes:
   a main body,
   a wheel installed on the main body, and
   a handle assembly installed on the main body, the handle assembly including a handle, a first control rod installed on the handle that is rotatable with respect to the handle and a second control rod that is installed on the handle and is rotatable with respect to the handle, wherein the first control rod and the second control rod rotate along the same axis;
   the handle includes a first arm portion inclining upward and extending backward, and a second arm portion parallel to and spaced from the first arm portion and a connecting portion connecting the first arm portion and the second arm portion, the connecting portion is substantially parallel to the horizontal plane, and the first control rod and the second control rod are separately disposed on the upper and lower sides of the connecting portion,
   the first control rod and the second control rod are alternately installed on the handle,
   wherein the handle assembly further comprises a first control box mounted on the first arm portion and a second control box mounted on the second arm portion, the first control box is provided with a first switch, and when the first control rod is pulled, the first switch can be triggered, the second control box is provided with a second switch, and when the second control rod is pulled, the second switch can be triggered.

2. The hand-push garden tool according to claim 1, wherein the first control box is provided with a first protruding portion, and a first cam that is installed on the first protruding portion and can trigger the first switch, the first control rod is coaxially connected with the first cam, and when the first control rod is rotated, the first cam can be driven to trigger the first switch.

3. The hand-push garden tool according to claim 2, wherein the second control box is provided with a second protruding portion coaxially arranged with the first protruding portion, and a second cam that is mounted on the second protruding portion can trigger the second switch, the second control rod is coaxially connected with the second cam, and when the second control rod is rotated, the second cam can be driven to trigger the second switch.

4. The hand-push garden tool according to claim 1, wherein the handle assembly further comprises a first elastic piece that can drive the first control rod to reset and a second elastic piece that can drive the second control rod to reset, the first elastic piece is located between the first control rod and the first control box, and the second elastic piece is located between the second control rod and the second control box.

5. The hand-push garden tool according to claim 4, further comprising a switch, which is pressable a first time to turn on the hand-push garden tool, wherein the first control rod is rotatable from a first initial position to a first set position, in which position the switch is pressable again, to start a first work assembly controlled by the first control rod; and wherein the first control rod is returnable to the first initial position when released, in which position the first work assembly controlled by the first control rod is stopped.

6. The hand-push garden tool according to claim 5, wherein the second control rod is rotatable from a second initial position to a second set position, to start a second work assembly controlled by the second control rod; and wherein the second control rod is returnable to the second initial position when released, in which position the second work assembly controlled by the second control rod is stopped.

7. The hand-push garden tool according to claim 6, wherein the rotation angle of the first control rod, when rotated from the first initial position to the first set position, is smaller than that of the second control rod when rotated from the second initial position to the second set position.

* * * * *